United States Patent
Gard et al.

(10) Patent No.: US 9,928,946 B2
(45) Date of Patent: Mar. 27, 2018

(54) METHOD FOR MANUFACTURING A POWER CABLE AND CABLE MANUFACTURED BY MEANS OF SUCH A METHOD

(71) Applicant: SILEC CABLE, Montereau Fault Yonne (FR)

(72) Inventors: Jean-Christophe Gard, Rosny sous Bois (FR); Isabelle Denizet, La Brosse Montceaux (FR); Mohammed Mammeri, Paron (FR); Bernard Poisson, Saint-Clement (FR); Freddy Lesage, Champagne sur Seine (FR); Jonathan Magnol, Champigny sur Marne (FR)

(73) Assignee: SILEC CABLE, Montereau Fault Yonne (FR)

( * ) Notice: Subject to any disclaimer, the term of this patent is extended or adjusted under 35 U.S.C. 154(b) by 0 days.

(21) Appl. No.: 14/425,075

(22) PCT Filed: Sep. 16, 2013

(86) PCT No.: PCT/EP2013/069172
§ 371 (c)(1),
(2) Date: Mar. 2, 2015

(87) PCT Pub. No.: WO2014/041174
PCT Pub. Date: Mar. 20, 2014

(65) Prior Publication Data
US 2015/0221419 A1     Aug. 6, 2015

(30) Foreign Application Priority Data
Sep. 17, 2012  (FR) ..................... 12 58714

(51) Int. Cl.
*H01B 13/14*     (2006.01)
*H01B 13/24*     (2006.01)
(Continued)

(52) U.S. Cl.
CPC ............. *H01B 13/14* (2013.01); *H01B 3/441* (2013.01); *H01B 7/0275* (2013.01); *H01B 13/24* (2013.01);
(Continued)

(58) Field of Classification Search
CPC ...................................... H01B 9/027
(Continued)

(56) References Cited

U.S. PATENT DOCUMENTS 4,212,787 A * 7/1980 Matsuda ................ C08J 9/0061
  428/31
4,234,531 A * 11/1980 Jocteur .................. B29C 47/02
  264/169

(Continued)

FOREIGN PATENT DOCUMENTS

EP    0 579 434 A1    1/1994
EP    1 070 737 A1    1/2001
(Continued)

OTHER PUBLICATIONS

International Search Report for PCT/EP2013/069172 dated Oct. 9, 2013.

*Primary Examiner* — Chau N Nguyen
(74) *Attorney, Agent, or Firm* — Sughrue Mion, PLLC (57) ABSTRACT

The invention relates to a method for manufacturing a cable, including, from the inside to the outside, a central electrical conductor (1), a first semiconductor screen (2), an intermediate electric insulator (3), a second semiconductor screen (4), a metal screen (5) and an outer sheath (6), the method comprising a step of extruding a composition comprising at
(Continued)

least one polyolefin for forming at least one layer constituting the first semiconductor screen, the intermediate electric insulator or second semiconductor screen and a step of cross-linking said layer. According to the invention, the method comprises the step of injecting, into the composition, a liquid solution containing at least one peroxide and at least one so-called cross-linking coagent, during the manufacture of said layer. The invention likewise relates to a cable manufactured by means of such a method.

15 Claims, 1 Drawing Sheet

(51) Int. Cl.
  *H01B 3/44* (2006.01)
  *H01B 7/02* (2006.01)
  *C08K 5/00* (2006.01)
  *C08K 5/14* (2006.01)
(52) U.S. Cl.
  CPC .............. *C08K 5/0025* (2013.01); *C08K 5/14* (2013.01); *Y10T 29/49117* (2015.01)

(58) Field of Classification Search
  USPC ..................................................... 174/120 SC
  See application file for complete search history.

(56) References Cited

U.S. PATENT DOCUMENTS

| | | | | |
|---|---|---|---|---|
| 4,239,644 A | * | 12/1980 | Nambu | ................. C07C 409/16 |
| | | | | 502/160 |
| 4,552,682 A | * | 11/1985 | Black | ..................... C09K 15/08 |
| | | | | 252/186.26 |
| 4,621,169 A | * | 11/1986 | Petinelli | ................... H01B 1/22 |
| | | | | 166/241.3 |
| 5,252,676 A | * | 10/1993 | Suyama | ................. H01B 3/441 |
| | | | | 525/263 |
| 2002/0169238 A1 | * | 11/2002 | Caronia | ................... C08K 5/14 |
| | | | | 524/100 |
| 2010/0212931 A1 | * | 8/2010 | Park | .................... C08L 23/0815 |
| | | | | 174/110 SR |

FOREIGN PATENT DOCUMENTS

| | | |
|---|---|---|
| EP | 1 944 327 A1 | 7/2008 |
| WO | 2012/010640 A1 | 1/2012 |

* cited by examiner

METHOD FOR MANUFACTURING A POWER CABLE AND CABLE MANUFACTURED BY MEANS OF SUCH A METHOD

CROSS REFERENCE TO RELATED APPLICATIONS

This application is a National Stage of International Application No. PCT/EP2013/069172 filed Sep. 16, 2013, claiming priority based on French Patent Application No. 12 58714 filed Sep. 17, 2012, the contents of all of which are incorporated herein by reference in their entirety.

The present invention relates to a process for the manufacture of a cable for the transportation of electrical energy and more particularly of a cable dedicated to the transportation of medium voltage electrical energy and of a cable dedicated to the transportation of high voltage electrical energy. Another subject matter of the invention is such cables.

TECHNOLOGICAL BACKGROUND OF THE INVENTION

Cables for the transportation of energy are generally composed of at least one central electrical conductor, surrounded by an intermediate electrical insulator, itself protected from the external environment by an external protective sheath. The conductor is generally composed of metal wires, of aluminum or of copper, assembled into strands. The external sheath is normally made of an electrically insulating thermoplastic material. In the past, the intermediate electrical insulator was formed from a thermoplastic material. More recently, the thermoplastic material has been replaced by crosslinked materials, essentially in order to bring the operating temperature of the cables to 90° C., with the possibility of an emergency overload temperature above 100° C. This has made it possible to increase the transportation capacity of power grids, a capacity limited by the heating of the conductors by Joule effect which depends on the properties of the metals used to form said conductors.

When the cable is intended to be subjected to a voltage greater than approximately one thousand volts, the cable additionally comprises conductive layers which are extruded or taped. The role of these conductor layers is to evenly distribute the electric field at the interfaces of the intermediate electrical insulators in order to prevent point effects and consequently to limit the risks of electrical breakdown.

Thus, the cables of this type generally comprise a first internal semiconducting shield in contact with the conductor and a second external semiconducting shield in contact with a metal shield which is intended to collect the leakage currents or the short circuit current, in the case of an incident, and which is itself in contact with the external sheath. The metal shield is connected to earth via a protection system which will trigger the opening of the circuit if the intensity which passes through the shield becomes too high. In such constructions, the complex formed of the intermediate electrical insulator surrounded by the two semiconducting shields is known as a trilayer.

In order to obtain crosslinked trilayers, it is normal in cable manufacture to use intermediate electrical insulators and/or semiconducting shields, the material of which is composed mainly of low density polyethylene to which additives, in particular peroxides, are added. These peroxides, the decomposition of which will result in the formation of radicals, will make it possible to create, in the polyethylene, a three-dimensional network which will provide the thermal stability and which will prevent mechanical deformation of the cable at the operating temperatures, that is to say 90° C. to 110° C.

It is known to choose the peroxide so that its rate of decomposition is virtually zero at ambient temperature, low at the temperature of conversion by extrusion of the material intended to form the intermediate electrical insulator and/or the semiconducting shields, and maximum at higher temperature.

In order to bring about such a rise in temperature, the material intended to form the intermediate electrical insulator is introduced, at ambient temperature, in the form of granules, into the hopper of an extruder and then melted in the screw of the extruder between 120 and 140° C. in general, in order to be brought to a plastic state and a viscosity which is sufficiently low to be shaped around the conductor. It is the same for the two semiconducting shields, which are generally coextruded, with the result that there is found, at the outlet of the triple-extrusion head of the extruder, a complex which still has to be crosslinked.

This operation takes place in a pipe of a few tens of, indeed even a few hundred, meters which is directly connected to the extrusion head via a telescopic part.

In the first part of the pipe, the cable is heated so as to make possible the decomposition of the peroxide or peroxides used and thus the crosslinking of the polyethylene. This heating can be obtained with a heat-exchange fluid, such as steam or oil. It is also possible for the complex to be heated by radiation of the pipe in a neutral atmosphere, such as gaseous nitrogen. In order to render more uniform the temperature of the components to be crosslinked (intermediate electrical insulator and semiconducting shields), recourse has also been had to systems which will heat the central conductor, for example by induction. The temperatures encountered in this first part of the pipe can be between 200 and 400° C., as a function of the nature of the materials involved, of the heating process used, of the geometry of the cable and of the manufacturing rate.

Following the first heating part, the pipe comprises a second part which is devoted to the cooling of the complex. In general, this cooling is obtained by passing the cable into cold water, which circulates continuously in the second part of the pipe by virtue of pumps, so as to maintain a relatively low constant temperature. On the more sophisticated lines and for the cables intended to be subjected to the highest voltages, the cooling can also be obtained by passing through an atmosphere of neutral gas, generally nitrogen, which circulates continuously in the second part of the pipe.

At the outlet of the pipe, the cable obtained has a completely crosslinked insulating trilayer and is at a sufficiently low temperature to be able to be wound onto a receiving cable drum without the cable being permanently deformed by the cable drum.

"Long-die" installations in which the crosslinking is obtained directly in the extruder are also known.

However, in all cases, during the heating of the material intended to form the intermediate electrical insulator and the semiconducting shields, the peroxides decompose to form the radicals necessary for the crosslinking of the polyethylene. In point of fact, the decomposition of the peroxides brings about the formation of by-products which are in fact molecules having lower molecular weights than those of the radicals and which are found trapped at the core of the three-dimensional network created in the polyethylene by the radicals of the peroxides. The formation of these by-products is particularly significant in the case of material intended to form the intermediate electrical insulator.

A portion of the by-products are gaseous at the crosslinking temperatures encountered in the first part of the pipe. It is in order to prevent the formation of bubbles in the intermediate electrical insulator and the semiconducting shields that the first part of the pipe is maintained under pressure between 8 and 25 bar. This is because such bubbles are particularly harmful to the electrical quality of the intermediate electrical insulator and the semiconducting shields.

After passing through the second part of the pipe, these by-products are still present in the dissolved state in the intermediate electrical insulator and the semiconducting shields, the crystallinity of the material of these preventing the formation of bubbles.

Thus, when the cable has exited from the pipe and been placed on the cable drum, it is still not ready for the following manufacturing operations and in particular for the positioning of the metal shield and the extrusion of the external sheath.

This is because a portion of the by-products, usually the most volatile portion, diffuses through the intermediate electrical insulator and the semiconducting shields and escapes toward the atmosphere. For example, for dicumyl peroxide, which is widely used in cable manufacture, the volatile by-products are methane and water vapor. If the manufacture of the cable is continued immediately after exiting from the pipe, for example by positioning the metal shield along the cable, the gas which is given off from the trilayer migrates to the ends of the metal shield and brings about the expansion of the metal shield. Once the cable is in use, this can bring about an electrical incident or alternatively an explosion.

For this reason, it is known not to immediately continue the manufacture of the cable when said cable has exited from the pipe. For a given period known as degassing stage, the cable which has exited from the pipe is left wound on a cable drum, which makes it possible for the most volatile by-products from the freshly manufactured trilayer to be discharged.

For the medium-voltage cables, this degassing stage generally takes a few days in general and is carried out at ambient temperature. Above an intermediate electrical insulator thickness of 6 millimeters, it is, however, necessary to condition the cables for approximately ten days at a temperature of between 50 and 90° C.

Thus, the degassing stage proves to be particularly long and considerably slows down the process for the manufacture of the cables, in particular of the cables dedicated to the transportation of high-voltage electrical energy, the thickness of the intermediate electrical insulator of which is greater. In addition, the degassing stage requires having available a large space for storing the cables. Furthermore, for the case of the very thick cables, the degassing stage proves to be energy intensive and requires having available appropriate ovens.

Solutions for reducing the content of volatile by-products produced during the stage of crosslinking the cable are known from the documents EP 1 944 327 and WO 2012/010640. The degassing stage is thus shortened, which makes it possible to accelerate the process for the manufacture of the cable in the end.

SUBJECT MATTER OF THE INVENTION

An aim of the invention is to provide a process for the manufacture of a cable for the transportation of electrical energy, the processing of which is further accelerated.

BRIEF DESCRIPTION OF THE INVENTION

For the purpose of achieving this aim, a process is provided for the manufacture of a cable for the transportation of electrical energy comprising at least, from the inside toward the outside, a central electrical conductor, a first semiconducting shield, an intermediate electrical insulator, a second semiconducting shield, a metal shield and an external sheath, the process comprising a stage of extrusion of a composition comprising at least one polyolefin, in order to form at least one layer making up the first semiconducting shield, the intermediate electrical insulator or the second semiconducting shield, and a stage of crosslinking said layer.

According to the invention, the process comprises the stage of injecting, into the composition, a liquid solution which comprises at least one peroxide and at least one compound referred to as cocrosslinking agent during the manufacture of said layer.

It has been found that the injection of the liquid solution comprising the peroxide and the cocrosslinking agent makes it possible to greatly limit the formation of the volatile by-products during the stage of crosslinking the layer.

The cocrosslinking agents are unsaturated and polyfunctional organic compounds which can form free radicals. The cocrosslinking agents, by forming a bridging between two polymer chains, make it possible to crosslink the polyolefin.

The cocrosslinking agent thus participates greatly in the crosslinking of the polyolefin. It is thus possible to limit the proportion of peroxide in the liquid solution while retaining a very good crosslinking of the polyolefin. As the peroxide gives rise to the formation of the undesirable volatile by-products, the limitation of the proportion of peroxide makes it possible to reduce the content of the volatile by-products produced during the crosslinking stage. The degassing stage is thus shortened, which makes it possible, in the end, to accelerate the process for the manufacture of the cable.

It has furthermore been found that, in some cases, the contents of the gaseous by-products and of the nongaseous by-products can be reduced to values such that the process for the manufacture of the cable does not require any degassing stage. In this case, it is possible to directly continue the manufacture of the cable by proceeding to the positioning of the metal shield and of the external sheath, which accelerates even more the process for the manufacture of the cable.

Figure 1:
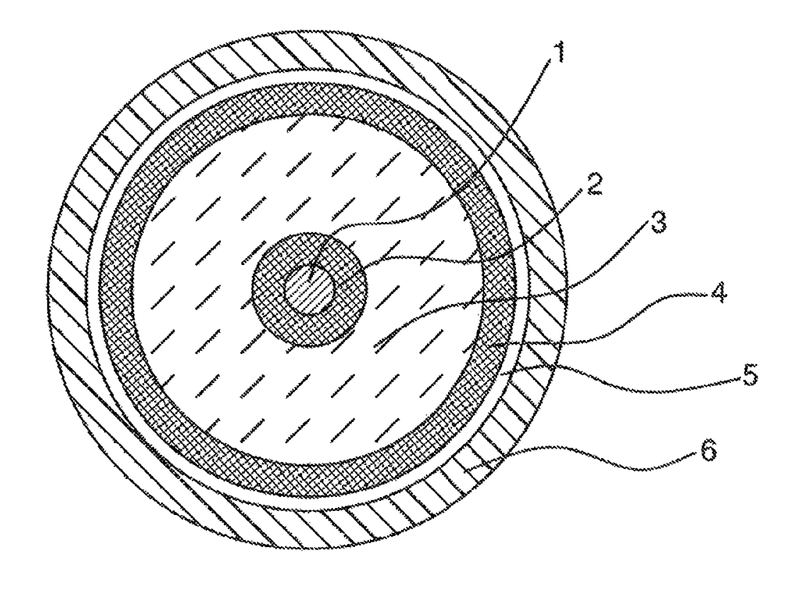

The values of the rheometric torques Mh of different structures of the layer of the intermediate electrical insulator 3, once the crosslinking stage is complete, when the layer has been manufactured according to the invention, are shown in the table below. It should be remembered that a rheometric torque makes it possible to evaluate the degree of crosslinking of a material. The greater the rheometric torque, the better the degree of crosslinking. The rheometric torque is here measured at 200° C. with a rheometer of RPA 2000 Analyzer type from Alpha Technologies.

The compositions studied are:
  composition No. 1: comprises, by weight, substantially 99.03% of linear low density polyethylene, 0.27% of antioxidant, 0.35% of 2,5-dimethyl-2,5-di(t-butylperoxy)hexane (also known as DBPH) as peroxide and 0.35% of triallyl isocyanurate (also known as TRIC) as type-II cocrosslinking agent;

composition No. 2: comprises, by weight, substantially 98.73% of linear low density polyethylene, 0.27% of antioxidant, 0.35% of DBPH and 0.65% of TRIC;

composition No. 3: comprises, by weight, substantially 98.58% of linear low density polyethylene, 0.27% of antioxidant, 0.35% of DBPH and 0.8% of TRIC.

It should be noted that, in order to satisfy the criterion "Elongation at 200° C. under a stress of 0.2 MPa of less than 175%" according to the standard CEI 60811-507 [with ° C. for degrees Celsius and MPa for Megapascals] while having a good crosslinking density, it is usually considered that the rheometric torque should be of the order of 3.3 with such a polyethylene type.

TABLE 1

| Index | Mh (lb · in) | Elongation under heat (%) |
|---|---|---|
| Composition 1 | 2.9 | 105 |
| Composition 2 | 3.5 | 70 |
| Composition 3 | 3.9 | 40 |

[with lb for pound (1 pound having the value of 453 grams) and in for inches (1 inch having a value of 2.54 centimeters)]

On reading table 1, it is clear that, by virtue of the cocrosslinking agent, it is possible to obtain a good crosslinking density of the polyethylene even with a low proportion of peroxide.

The invention thus makes it possible to manufacture the layer making up the first semiconducting shield and/or the second semiconducting shield and/or the intermediate electrical insulator with little in the way of undesirable by-products.

Preferably, the liquid solution is chosen so that the material of said layer comprises, after the extrusion stage, a lower percentage by weight of peroxide, with respect to the polyolefin, than the percentage by weight of the cocrosslinking agent, with respect to the polyolefin.

By virtue of the cocrosslinking agent, it is possible to considerably reduce the proportion of peroxide without damaging the crosslinking of the polyolefin: the process of the invention thus makes it possible to have a content of peroxide which is lower than the cocrosslinking agent. On reading table 1, it is clear that compositions 2 and 3, which are more concentrated in cocrosslinking agent than in peroxide, make it possible to obtain a better crosslinking density of the polyethylene despite their low proportions of peroxide.

Furthermore, the inventors have been able to observe that the contents of the gaseous by-products and of the nongaseous by-products may thus be particularly low, which makes it possible to reduce, indeed even to completely dispense with, the degassing stage.

According to a specific embodiment, for the manufacture of the layer forming the intermediate electrical insulator, the stage of injecting the liquid solution into the composition is carried out during the extrusion stage.

The liquid solution is thus mixed with the composition directly during the extrusion stage. It is thus not necessary to disperse the peroxide and the cocrosslinking agent in the composition prior to the extrusion stage. This thus makes it possible to accelerate even more the process for the manufacture of the cable. Advantageously, the screw of the extruder which carries out the extrusion stage makes it possible to ensure that the composition and the solution are correctly mixed in addition to advancing the composition/solution mixture in the heated part of the extruder.

In addition, to inject the solution and not to mix it with the composition before the extrusion stage exhibits the advantage that the liquid solution, during the injection, can be very easily filtered. The final composition which is extruded thus proves to be of much better quality.

Furthermore, in the prior art, the peroxide is dispersed in the composition before the extrusion stage. In point of fact, during the storage of the composition mixed with the peroxide, the peroxide has a tendency to move into the polyolefin of the composition, which results in phenomena of exudation of the peroxide. By injecting the solution directly during the extrusion stage, said exudation problems are thus overcome. The final composition which is extruded thus proves to be of much better quality.

According to another favored embodiment of the invention, a type-II cocrosslinking agent is chosen.

It should be remembered that a type-II cocrosslinking agent is a compound which comprises molecules carrying unsaturated bonds intended to interact with free radicals of the polyolefin during the formation of the intermediate electrical insulator, said molecules being vinyl or allyl derivatives or polybutadienes.

It has thus been found that the injection of the liquid solution comprising peroxide and type-II cocrosslinking agent makes it possible to further limit the formation of the volatile by-products during the stage of crosslinking the intermediate electrical insulator.

In particular, the use of the type-II cocrosslinking agent greatly favors the crosslinking of the polyolefin.

In addition, the type-II cocrosslinking agents also form free radicals which are more stable than those of type-I cocrosslinking agents.

It has also been found that type-II cocrosslinking agents are less "scorching" than the type-I cocrosslinking agents, that is to say that the type-II cocrosslinking agents are less reactive than the type-I cocrosslinking agents. Thus, during the extrusion stage, the molecules carrying unsaturated bonds of the type-II cocrosslinking agent interact less rapidly with the free radicals of the polyolefin, which limits a start of crosslinking in the extruder, which is not desired.

The values of the rheometric torques Mh of different structures of the layer of the intermediate electrical insulator 3, once the crosslinking stage is complete, when the layer has been manufactured according to the invention, are shown in the table below. It should be remembered that a rheometric torque makes it possible to evaluate the degree of crosslinking of a material. The greater the rheometric torque, the better the degree of crosslinking. The rheometric torque is here measured at 200° C. with a rheometer of RPA 2000 Analyzer type from Alpha Technologies.

The compositions studied are:

composition No. 1: comprises, by weight, substantially 99.03% of linear low density polyethylene, 0.27% of antioxidant, 0.35% of 2,5-dimethyl-2,5-di(t-butylperoxy)hexane (also known as DBPH) as peroxide and 0.35% of triallyl isocyanurate (also known as TRIC) as type-II cocrosslinking agent;

composition No. 2: comprises, by weight, substantially 98.73% of linear low density polyethylene, 0.27% of antioxidant, 0.35% of DBPH and 0.65% of TRIC;

composition No. 3: comprises, by weight, substantially 98.58% of linear low density polyethylene, 0.27% of antioxidant, 0.35% of DBPH and 0.8% of TRIC.

It should be noted that, in order to satisfy the criterion "Elongation at 200° C. under a stress of 0.2 MPa of less than 175%" according to the standard CEI 60811-507 [with ° C. for degrees Celsius and MPa for Megapascals] while having a good crosslinking density, it is usually considered that the rheometric torque should be of the order of 3.3 with such a polyethylene type.

TABLE 1

| Index | Mh (lb · in) | Elongation under heat (%) |
|---|---|---|
| Composition 1 | 2.9 | 105 |
| Composition 2 | 3.5 | 70 |
| Composition 3 | 3.9 | 40 |

[with lb for pound (1 pound having the value of 453 grams) and in for inches (1 inch having a value of 2.54 centimeters)]

On reading table 1, it is clear that, by virtue of the type-II cocrosslinking agent, it is possible to obtain a good crosslinking density of the polyethylene even with a low proportion of peroxide.

The invention also relates to a cable for the transportation of electrical energy, comprising at least, from the inside toward the outside, a central electrical conductor, a first semiconducting shield, an intermediate electrical insulator, a second semiconducting shield, a metal shield and an external sheath.

According to the invention, the material of the intermediate electrical insulator and/or of the first semiconducting shield and/or of the second semiconducting shield comprises at least one polyolefin into which has been injected a liquid solution comprising at least one peroxide and at least one compound referred to as cocrosslinking agent.

BRIEF DESCRIPTION OF THE DRAWINGS

Reference will be made to the single appended FIGURE diagrammatically representing, in cross section, a cable in accordance with the invention.

DETAILED DESCRIPTION OF THE INVENTION

The cable for the transportation of electrical energy according to the invention comprises, from the inside toward the outside, a central electrical conductor 1, a first semiconducting shield 2, an intermediate electrical insulator 3, a second semiconducting shield 4, a metal shield 5 and an external sheath 6.

The central conductor 1 is, for example, made of aluminum.

The materials of the first semiconducting shield 2 and of the second semiconducting shield 4 are in this instance based on copolymer and on carbon black. In order to facilitate the connecting of several cables according to the invention, the second semiconducting shield 4 can be "peelable", that is to say that it can be easily separated from the intermediate electrical insulator 3. The central electrical conductor 1, the first semiconducting shield 2, the second semiconducting shield 4, the metal shield 5 and the sheath 6 are known per se and will not be described in more detail here.

According to the invention, the material of the intermediate electrical insulator 3 comprises at least one polyolefin into which has been injected, during the manufacture of the cable, a liquid solution comprising at least one peroxide and at least one "cocrosslinking agent" compound.

In order to form the intermediate electrical insulator 3, a composition comprising at least the polyolefin is extruded by an extruder. In a way known per se, the extruder comprises a hopper emerging in a heated cylindrical barrel in which an endless screw rotates, the screw making possible the movement of the composition from the hopper up to the outlet orifice of the barrel. Granules of the composition are introduced into the hopper and the screw continuously pushes the granules, which progressively soften in the barrel to the point of melting. The composition is thus brought to a plastic state and to a sufficiently low viscosity to be shaped around the central conductor 1 in the form of a continuous tube at the outlet of the extruder, so as to thus constitute the intermediate electrical insulator 3. As is well known in the prior art, once the extrusion stage is complete, the manufacturing process according to the invention comprises the stage of crosslinking the intermediate electrical insulator 3 in order to improve the mechanical characteristics of the intermediate electrical insulator 3.

According to the invention, the liquid solution is injected into the composition during the extrusion stage. The solution is in this instance added to the granules of the composition by a dropwise injection device which is arranged substantially at the inlet of the extruder at the level of the hopper.

Advantageously, in addition to pushing the granules through the extruder, the screw makes it possible to ensure that the composition and the liquid solution which are intended to form the material of the intermediate electrical insulator 3 correctly mix. The mixing of the composition and of the solution is thus carried out directly during the extrusion stage. It is no longer necessary to disperse the peroxide and the cocrosslinking agent in the composition prior to the extrusion stage.

Preferably, the cocrosslinking agent is a type-II cocrosslinking agent.

Preferably, the polyolefin is a polyethylene and the liquid solution is chosen so that the material of the intermediate electrical insulator 3 comprises, at the outlet of the extruder before the crosslinking stage, between 0.01% and 1.2% by weight of peroxide, with respect to the polyethylene, and between 0.3% and 4% by weight of type-II cocrosslinking agent, with respect to the polyethylene. The liquid solution is chosen in this instance so that said material comprises between 0.01% and 1% by weight of peroxide, with respect to the polyethylene.

According to a preferred embodiment, the liquid solution is chosen so that said material comprises, after the extrusion stage, a lower percentage by weight of peroxide, with respect to the polyethylene, than the percentage by weight of the cocrosslinking agent, with respect to the polyethylene.

Preferably, the polyethylene chosen is linear low density polyethylene.

Such a linear low density polyethylene crosslinks in a much more active way than a radical polyethylene.

Thus, by using linear low density polyethylene, the liquid solution can comprise less peroxide without this being harmful to the crosslinking of the composition.

It is thus possible to limit the formation of undesirable by-products resulting from the decomposition of peroxide during the crosslinking of the composition. This makes it possible to shorten, indeed even to dispense with, the degassing stage after the stage of crosslinking the composition.

Furthermore, the linear low density polyethylene has a much more orderly structure than a radical polyethylene. Its melting point is thus higher, which makes it possible to employ the cable according to the invention at higher temperatures and thus to pass a greater amount of current through the central conductor 1. The cable according to the invention is thus particularly suitable for the transportation of medium-voltage and high-voltage electrical energy.

The linear low density polyethylene is, for example, selected from the following references:

TABLE 2

| Commercial name | Density (g/cm³) ISO 1183 | Melt flow index (MFI) (g/10 min) (190° C., 2.16 kg) ISO 1133 | Melting point (° C.) | Type of comonomer |
|---|---|---|---|---|
| BPD 3052 | 0.93 | 4 | 126.3 | Butene |
| BPD 3220 | 0.92 | 2.4 | 124.6 | Butene |
| BPD 3669 | 0.926 | 3.3 | 126.8 | Hexene |
| Sabic V036 | 0.93 | 4.2 | 124 | Butene |
| Flexirene CL10F | 0.918 | 2.7 | 122 | Butene |
| Exxon Mobil 4004 EL | 0.924 | 3.6 | 122 | Butene |
| Dow 2035G | 0.919 | 6 | 125.3 | Octene |

(with g for grams, cm³ for cubic centimeters, ° C. for degrees Celsius, kg for kilograms).

The values of rheometric torque Mh for different compositions of the material of the intermediate electrical insulator 3, once the crosslinking stage is complete, are shown in the table below:

composition No. 1: comprises, by weight, substantially 98.1% of radical polyethylene of BP 2000 (Ineos registered trademark) type, 0.3% of antioxidant and 1.6% of tert-butyl cumyl peroxide (also known as TBCP) as peroxide;

composition No. 2: comprises, by weight, substantially 98.1% of linear low density polyethylene of BP 3220 (Ineos registered trademark) type, 0.3% of antioxidant and 1.6% of TBCP.

TABLE 3

|  | Composition No. 1 | Composition No. 2 |
|---|---|---|
| Mh (lb · in) | 2.5 | 5.6 |

The above rheometric torque values confirm that, at identical peroxide contents, the crosslinking proves to be much greater with a linear low density polyethylene than with a radical polyethylene.

In point of fact, in order to satisfy the "Elongation at 200° C. under a stress of 0.2 MPa of less than 175%" criterion according to the standard CEI 60811-50 while having a good crosslinking density, it is usually considered that the rheometric torque should be of the order of 3.3 for a linear low density polyethylene. For the same criterion, it is usually considered that the rheometric torque should be of the order of 2.2 for a radical polyethylene.

In the present case, it is thus possible to change from a rheometric torque of 5.6 to a rheometric torque of 3.3 for the linear low density polyethylene while retaining a satisfactory crosslinking density, whereas it is possible to change only from a rheometric torque of 2.5 to 2.2 for the radical polyethylene. It is thus possible to lower the content of peroxide much more significantly in composition No. 2 than in composition No. 1.

Once again, by using a linear low density polyethylene in place of a radical polyethylene, the liquid solution can comprise less peroxide, which makes it possible to limit the formation of undesirable by-products, without this being harmful to the crosslinking of the composition.

Favorably, the peroxide is a nonaromatic peroxide.

The nonaromatic peroxide makes it possible for the by-products resulting from the decomposition of said peroxide during the crosslinking stage to have relatively low molecular weights. Said by-products then prove to be much easier to discharge from the intermediate electrical insulator 3. The degassing stage is thus accelerated.

In addition, it should be remembered that the degassing stage is not always carried out at ambient temperature (which is substantially in the vicinity of 20° C.). In the prior art, for cables having an intermediate electrical insulator thickness of greater than 6 millimeters, it is known to condition said cables for approximately ten days at a temperature of between 50 and 90° C. In the invention, by virtue of the use of a nonaromatic peroxide, it is then possible to lower the temperature at which the cable is stored and thus to reduce the energy consumption necessary at this degassing stage.

Preferably, the liquid solution is obtained by mixing a liquid nonaromatic peroxide and a solid type-II cocrosslinking agent with a liquid antioxidant. The type-II cocrosslinking agent is obviously chosen in order to be soluble in the liquid antioxidant and the nonaromatic peroxide is optionally chosen to be miscible with the liquid antioxidant.

The aging of the material of the intermediate electrical insulator 3, that is to say the degradation of said material over time, is generally due to the effects of temperature, oxygen and possibly light and is displayed by the formation of very reactive free radicals inside the intermediate electrical insulator 3. By adding the antioxidant to the liquid solution, the molecules of said compound react with these free radicals so as to neutralize them. This makes it possible to avoid degradation reactions within the intermediate electrical insulator 3 due to the presence of said free radicals. The lifetime of the cable is thus lengthened.

The liquid antioxidant is, for example, Irgastab Cable KV 10 (BASF registered trademark).

The liquid solution additionally comprises, in this instance, at least one "anti-scorching" compound.

Such a compound is intended to neutralize at least the first undesirable by-products resulting from the decomposition of the peroxide during the crosslinking of the intermediate electric insulator 3. The quality of the material of the intermediate electric insulator 3 is found to be improved thereby.

A specific embodiment of the invention will now be described.

In this embodiment, the screw of the extruder has a diameter of 45 millimeters and a length of 1080 millimeters. The screw comprises a crosshead and four separate heating zones. The screw rotates at 30 revolutions per minute.

During the extrusion stage, granules of Flexirene CL 10 F, a linear low density polyethylene, are introduced into the hopper.

The liquid solution is prepared by mixing triallyl isocyanurate (also known as TRIC) as type-II cocrosslinking agent, 2,5-dimethyl-2,5-di(t-butylperoxy)-hexane (also known as DBPH) as nonaromatic peroxide and Irgastab Cable KV 10 as antioxidant. The solution is then filtered through a 25 micrometer sieve before being injected at the inlet of the extruder into the granules.

The temperature profile of the screw used for the extrusion of the mixture is as follows:

TABLE 4

| Zones | 1 | 2 | 3 | 4 | Flange of the screw | Head of the screw |
|---|---|---|---|---|---|---|
| Temperature (° C.) | 100 | 105 | 110 | 115 | 120 | 120 |

At the outlet of the extruder, before the crosslinking stage, the material of the intermediate electrical insulator 3 comprises, by weight, substantially 98.75% of Flexirene CL 10 F, substantially 0.25% of Irgastab Cable KV 10, substantially 0.35% of DBPH and substantially 0.65% of TRIC.

Thus, the liquid solution is clearly chosen here so that said material comprises, after the extrusion stage, a lower percentage by weight of peroxide, with respect to the polyolefin, than the percentage by weight of the cocrosslinking agent, with respect to the polyolefin.

Test specimens are created from the intermediate electrical insulator 3 obtained at the extruder outlet.

Said test specimens are crosslinked under a press at 190° C. for 15 minutes. Different properties are then measured on said crosslinked test specimens.

TABLE 5

|  |  | Standards |
|---|---|---|
| Rheometric torque Mh (lb · in) | 3.5 | — |
| Elongation at 200° C. and 0.2 MPa (%) | 58 | CEI 60811-507 |
| Peelability (N/cm) | 8.8 | NFC 33226 |
| Initial mechanical characteristics |  |  |
| Tensile strength (MPa) | 28.6 | CEI 60811-501 |
| Elongation at break (%) | 660 |  |
| Aging 7 days at 135° C. |  |  |
| ΔTensile strength (%) | 6 | CEI 60811-401 |
| ΔElongation at break (%) | 15 |  |
| Aging 10 days at 150° C. |  |  |
| Tensile strength (MPa) | 28.2 |  |
| Elongation at break (%) | 664 |  |
| Aging 20 days at 150° C. |  |  |
| Tensile strength (MPa) | 27 |  |
| Elongation at break (%) | 638 |  |
| Electrical characteristics |  |  |
| Dissipation factor Tan δ at 25° C. at 2 kV | 3.1 × E−4 | NFC 26230 |
| Relative permittivity $\epsilon_r$ at 25° C. | 2.1 |  |

(with N for newton, cm for centimeter, MPa for Megapascal, kV for kilovolt)

The material of the intermediate electrical insulator 3 thus exhibits highly satisfactory mechanical, thermal and electrical properties. In addition, the material exhibits a good resistance to aging.

In addition, it is observed that the crosslinked test specimens comprise a methane content of 98 parts per million (ppm), and an ethane content of 45 ppm, i.e. a total gas content of 143 ppm.

In comparison, a test specimen crosslinked in the same way and formed from a reference material comprising, by weight, 98.2% of BP 2000, which is a radical polyethylene, 0.3% of antioxidant and 1.5% of tert-butyl cumyl peroxide (also known as TBCP) as aromatic peroxide, comprises a methane content of 645 ppm and an ethane content of 40 ppm, i.e. a total gas content of 685 ppm.

Thus, the cable of the invention comprises an intermediate electrical insulator 3 comprising a much lower gas content than that of a cable of the prior art once the crosslinking stage is complete. The degassing stage will thus be much shorter, indeed even nonexistent, with the cable of the invention, so that the process for the manufacture of such a cable is accelerated.

In addition, the process according to the invention makes it possible to select, as peroxide and as cocrosslinking agent, already existing commercial products. It is thus not necessary to synthesize, by lengthy and tedious stages, a "laboratory" peroxide or cocrosslinking agent especially suited to the application envisaged, before forming the liquid solution.

Of course, the invention is not limited to the embodiment described and alternative forms may be introduced thereto without departing from the scope of the invention as defined by the claims.

Thus, the thicknesses of the different layers forming the cable will, of course, be determined as a function in particular of the current and of the voltage to which the cable is intended to be subjected. Furthermore, although the cable described is dedicated to the transportation of direct or alternating medium-voltage or direct or alternative high-voltage electrical energy, the cable can also be arranged for the transportation of low-voltage electrical energy. Of course, the term "high-voltage" is understood to mean a voltage of between 30 and 500 kV, the term "medium-voltage" is understood to mean a voltage of between 1 and 30 kV and the term "low-voltage" is understood to mean a voltage of less than 1 kV.

In particular, although in this instance the process according to the invention has been employed for the manufacture of the layer making up the intermediate electrical insulator, the process can be employed for the manufacture of one or both of the semiconducting shields. A composition of the material of the semiconducting shields, once the crosslinking stage is complete, comprises, for example, by weight, substantially 63.5% of a polyolefin (such as a polar polymer of ethylene/acrylate or ethylene/vinyl acetate type) charged with 35% of carbon black, 0.5% of peroxide and 1% of cocrosslinking agent. Of course, this example is not limiting.

Here again, the liquid solution is thus chosen so that said material comprises, after the extrusion stage, a lower percentage by weight of peroxide, with respect to the polyolefin, than the percentage by weight of the cocrosslinking agent, with respect to the polyolefin.

In the case of the semiconducting shields, the process comprises the successive stages of:
  mixing the different components of the composition comprising at least one polyolefin via a continuous mixer;
  injecting the liquid solution comprising at least one peroxide and one cocrosslinking agent into the composition;
  extruding the mixture formed of the composition and of the liquid solution;
  crosslinking said extruded mixture.

The different aspects of the invention described in connection with the intermediate electrical insulator apply, of course, to the two semiconducting shields, apart from the fact that the liquid solution is not injected at the same time into the composition.

In addition, the process according to the invention can be employed for the manufacture both of the layer making up the intermediate electrical insulator and layers making up the semiconducting shields. The layers will then be coextruded: the layers will be extruded in separate barrels via separate extrusion screws, three barrels being connected via a triple extrusion head. At the outlet of the extruder, a trilayer is thus obtained which is appropriate to crosslink.

Although it has been described that the injection of the liquid solution was carried out by a dropwise injection device, the injection stage can be carried out by another device. For example, the injection stage can be carried out via a continuous spraying device along the screw but also by injection into the barrel of the extruder via a pump.

Of course, the liquid solution can have a different composition from that which is described, provided that the solution is sufficiently liquid to be able to be easily injected into the extruder. The different ingredients of the liquid solution will thus be liquid and miscible with one another and/or solid and soluble with the other ingredients. Thus, the liquid solution can comprise a solid peroxide and a liquid cocrosslinking agent or also a liquid peroxide and a solid cocrosslinking agent. The peroxide and the cocrosslinking agent can both be solids and be mixed with a liquid solvent. The liquid peroxide can then be chosen from the following commercial references: Luperox 801 (comprising the molecule t-butyl cumyl peroxide), Luperox 130 (comprising the molecule 2,5-dimethyl-2,5-di(t-butylperoxy)hex-3-yne), Luperox 233 (comprising the molecule ethyl 3,3-di(t-butylperoxy)butyrate), LUPEROX 533 (comprising the molecule ethyl 3,3-di(t-amylperoxy)butyrate), TRIGONOX B (comprising the molecule di(t-butyl) peroxide), TRIGONOX 101 (comprising the molecule 2,5-dimethyl-2,5-di(t-butylperoxy)hexane) or also TRIGONOX 201 (comprising the molecule di(t-amyl) peroxide).

Once again, the process of the invention makes it possible to be able to employ, as peroxide, a commercial product.

The liquid solution can comprise other compounds in addition to the peroxide and the cocrosslinking agent, such as water-treeing inhibitors and/or UV inhibitors and/or acid scavengers and/or anti-scorching compounds and/or antioxidants, and the like. Some compounds can also play the double role of antioxidant and of anti-scorching compound or else the double role of antioxidant and of UV inhibitor.

Although in this instance the peroxide is chosen as nonaromatic, the peroxide can also be chosen as being aromatic or semiaromatic.

Although in this instance the cocrosslinking agent is a type-II cocrosslinking agent, the cocrosslinking agent can be of another type, such as a type-I cocrosslinking agent, such as ethylene glycol dimethacrylate.

The antioxidant can be solid and nonliquid. The antioxidant will, for example, be Irganox 1081, which is soluble in liquid peroxides, or also Lowinox TBP6.

Of course, the composition can be different from that which has been described. Thus, although in this instance the composition comprises polyethylene, the composition can comprise one or more polyolefins and optionally another polyolefin, such as ethylene/ethyl acrylate (EEA) or also ethylene/butyl acrylate (EBA), and the like, or else can comprise other ingredients in addition to a first polyolefin, such as a second polyolefin, one or more copolymers, water-treeing inhibitors, UV inhibitors, acid scavengers, anti-scorching compounds, antioxidants, peroxides, inorganic or organic fillers, and the like.

Although in this instance the polyethylene chosen is a linear polyethylene, the polyethylene chosen can be a radical polyethylene. Linear polyethylenes in general and linear low density polyethylenes in particular will be favored. A radical polyethylene can thus be chosen, for example, from the following commercial references:

TABLE 6

| Commercial name | Supplier | Density (g/cm³) ISO 1183 | MFI (g/10 min) (190° C., 2.16 kg) ISO 1133 |
|---|---|---|---|
| LD 100 | Exxon | 0.923 | 2 |
| PE 004 | Repsol | 0.920 | 2.7 |
| BP 2000 | Ineos | 0.923 | 2 |

Favorably, if it is decided that the composition should comprise a radical polyethylene, BP 2000 is chosen as radical polyethylene and the liquid solution is chosen so that the material of the intermediate electrical insulator comprises, after the crosslinking stage, 0.3% by weight of antioxidant, with respect to the BP 2000, 1.7% of triallyl cyanurate (TAC), as cocrosslinking agent, and 0.5% of DBPH. This is because such an intermediate electrical insulator exhibits a low content of undesirable by-products.

Here again, the liquid solution is thus chosen so that said material comprises, after the extrusion stage, a lower percentage by weight of peroxide, with respect to the polyolefin, than the percentage by weight of the cocrosslinking agent, with respect to the polyolefin.

The term "at least one layer making up the first semiconducting shield, the intermediate electrical insulator or the second semiconducting shield" is understood to mean: either the layer constituting the first semiconducting shield, the intermediate electrical insulator or the second semiconducting shield, when the screen or the insulator in question comprises only one layer; or at least one of the layers constituting the first semiconducting shield, the intermediate electrical insulator or the second semiconducting shield, when the shield or the insulator in question comprises several layers. Furthermore, the composition can be incorporated in one or other of the shields, or in both shields and/or in the insulator.

The invention claimed is:

1. A process for the manufacture of a cable for the transportation of electrical energy comprising at least, from the inside toward the outside, a central electrical conductor (1), a first semiconducting shield (2), an intermediate electrical insulator (3), a second semiconducting shield (4), a metal shield (5) and an external sheath (6), the process comprising a stage of extrusion of a composition comprising at least one polyolefin, in order to form at least one layer making up the first semiconducting shield, the intermediate electrical insulator or the second semiconducting shield, and a stage of crosslinking said layer, the process being characterized in that it comprises a stage of injecting, into the composition, a liquid solution which comprises at least one peroxide and at least one compound referred to as cocrosslinking agent during the manufacture of said layer, each different ingredients of the liquid solution being liquid and miscible with the other ingredients of the liquid solution or being solid and soluble with the other ingredients of the liquid solution, wherein a polyethylene is chosen as polyolefin for the composition forming the layer and in addition the liquid solution is chosen so that the composition comprises between 0.01% and 1.2% by weight of peroxide, with respect to the polyethylene, and between 0.3% and 4% by weight of the cocrosslinking agent, with respect to the polyethylene, and wherein the composition comprises a lower percentage by weight of peroxide, with respect to the polyolefin, than the percentage by weight of the cocrosslinking agent, with respect to the polyolefin.

2. The process as claimed in claim 1, in which the liquid solution is chosen so that the composition comprises between 0.01% and 1% by weight of peroxide, with respect to the polyethylene.

3. The process as claimed in claim 1, in which, for the manufacture of the layer forming the intermediate electrical insulator, the stage of injecting the liquid solution into the composition is carried out during the extrusion stage.

4. The process as claimed in claim 1, in which, for the manufacture of the layer forming one of the two semiconducting shields, the stage of injecting the liquid solution into the composition is carried out before the extrusion stage.

5. The process as claimed in claim 1, in which the cocrosslinking agent is a type-II cocrosslinking agent.

6. The process as claimed in claim 1, in which the at least one peroxide is a nonaromatic peroxide.

7. The process as claimed in claim 1, in which the at least one peroxide is an aromatic peroxide.

8. The process as claimed in claim 1, comprising the stage of mixing at least one liquid antioxidant compound with a liquid peroxide, as the at least one peroxide, and a solid type-II cocrosslinking agent, as the cocrosslinking agent, in order to obtain the liquid solution.

9. The process as claimed in claim 1, in which the polyolefin is a linear low density polyethylene.

10. The process as claimed in claim 1, in which the liquid solution and/or the composition additionally comprises at least one "anti-scorching" compound.

11. The process as claimed in claim 1, comprising the stages of:
Coextruding the intermediate electrical insulator, the first semiconducting shield and the second semiconducting shield in order to form a complex;
Crosslinking said complex;
Directly arranging the metal shield and the external sheath around the crosslinked complex without carrying out a degassing stage.

12. A cable for the transportation of electrical energy, comprising at least, from the inside toward the outside, a central electrical conductor, a first semiconducting shield, an intermediate electrical insulator, a second semiconducting shield, a metal shield and an external sheath, characterized in that the material of the intermediate electrical insulator and/or of the first semiconducting shield and/or of the second semiconducting shield comprises at least one polyolefin into which has been injected a liquid solution comprising at least one peroxide and at least one compound referred to as cocrosslinking agent, wherein each ingredient of the liquid solution is a liquid that is miscible with the other ingredients of the liquid solution or is a solid that is soluble with the other ingredients of the liquid solution,
wherein a polyethylene is chosen as polyolefin for the composition forming the layer and in addition the liquid solution is chosen so that the composition comprises between 0.01% and 1.2% by weight of peroxide, with respect to the polyethylene, and between 0.3% and 4% by weight of the cocrosslinking agent with respect to the polyethylene, and
wherein the composition comprises a lower percentage by weight of peroxide, with respect to the polyolefin, than the percentage by weight of the cocrosslinking agent with respect to the polyolefin.

13. The cable as claimed in claim 12, arranged for the transportation of medium-voltage electrical energy.

14. The cable as claimed in claim 12, arranged for the transportation of high-voltage electrical energy.

15. A process for the manufacture of a cable for the transportation of electrical energy comprising at least, from the inside toward the outside, a central electrical conductor (1), a first semiconducting shield (2), an intermediate electrical insulator (3), a second semiconducting shield (4), a metal shield (5) and an external sheath (6), the process comprising a stage of extrusion of a composition comprising at least one polyolefin, in order to form at least one layer making up the first semiconducting shield, the intermediate electrical insulator or the second semiconducting shield, and a stage of crosslinking said layer, the process being characterized in that it comprises a stage of injecting, into the composition, a liquid solution which comprises at least one peroxide and at least one compound referred to as cocrosslinking agent during the manufacture of said layer, wherein each ingredient of the liquid solution is a liquid that is miscible with the other ingredients of the liquid solution or is a solid that is soluble with the other ingredients of the liquid solution,
wherein the process further comprising the stages of:
coextruding the intermediate electrical insulator, the first semiconducting shield and the second semiconducting shield in order to form a complex;
crosslinking said complex;
directly arranging the metal shield and the external sheath around the crosslinked complex without carrying out a degassing stage,
wherein a polyethylene is chosen as polyolefin for the composition forming the layer and in addition the liquid solution is chosen so that the composition comprises between 0.01% and 1.2% by weight of peroxide, with respect to the polyethylene, and between 0.3% and 4% by weight of the cocrosslinking agent with respect to the polyethylene, and wherein the composition comprises a lower percentage by weight of peroxide, with respect to the polyolefin, than the percentage by weight of the cocrosslinking agent with respect to the polyolefin.

* * * * *